US008988824B1

(12) United States Patent
Brinkman et al.

(10) Patent No.: US 8,988,824 B1
(45) Date of Patent: Mar. 24, 2015

(54) METHOD FOR MANUFACTURING A MAGNETIC WRITE POLE WITH A CONSISTENT BEVEL ANGLE

(71) Applicant: HGST Netherlands B.V., Amsterdam (NL)

(72) Inventors: Elizabeth A. Brinkman, Santa Clara, CA (US); Ning Shi, San Jose, CA (US); Brian R. York, San Jose, CA (US); Sue S. Zhang, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/139,779

(22) Filed: Dec. 23, 2013

(51) Int. Cl.
  *G11B 5/127* (2006.01)
(52) U.S. Cl.
  USPC .................................................. 360/125.3
(58) Field of Classification Search
  USPC .................................................. 360/125.3
  See application file for complete search history.

(56) References Cited

U.S. PATENT DOCUMENTS

| 7,716,813 | B2 | 5/2010 | Lee et al. | |
|---|---|---|---|---|
| 8,074,345 | B1 | 12/2011 | Anguelouch et al. | |
| 8,110,085 | B2 | 2/2012 | Hsiao et al. | |
| 8,179,634 | B2 | 5/2012 | Hsiao et al. | |
| 8,547,661 | B2 * | 10/2013 | Bai | 360/125.3 |
| 8,570,686 | B2 * | 10/2013 | Hosomi et al. | 360/125.3 |
| 8,630,064 | B2 * | 1/2014 | Maeda et al. | 360/125.3 |
| 8,649,125 | B1 * | 2/2014 | Basu et al. | 360/125.3 |
| 8,699,183 | B2 * | 4/2014 | Sahoo et al. | 360/125.03 |
| 8,760,804 | B2 * | 6/2014 | Brinkman et al. | 360/123.02 |
| 8,830,625 | B2 * | 9/2014 | Linville et al. | 360/125.3 |
| 8,842,390 | B2 * | 9/2014 | Shen et al. | 360/125.3 |
| 2010/0290157 | A1 | 11/2010 | Zhang et al. | |
| 2011/0042349 | A1 | 2/2011 | Zhou et al. | |
| 2011/0132869 | A1 | 6/2011 | Hong et al. | |
| 2011/0151279 | A1 | 6/2011 | Allen et al. | |

OTHER PUBLICATIONS

Okada, T. et al., "Fabrication Process for a Trapezoidal Main Pole for Single-Pole-Type Heads," IEEE Transactions on Magnetics, vol. 38, No. 5, Sep. 2002, pp. 2249-2252.

* cited by examiner

*Primary Examiner* — Mark Blouin
(74) *Attorney, Agent, or Firm* — Zilka-Kotab, PC

(57) ABSTRACT

A method for manufacturing a magnetic write head that has improved write poled uniformity and bevel angle control. The method uses a damascene process to form the write pole, wherein a trench is formed in a RIEable fill layer, and an adhesion layer is located only in areas outside of the trench. A seed layer is deposited into the trench, followed by a non-magnetic gap layer followed by electroplating of a magnetic material. A chemical mechanical polishing process is then performed, thereby forming a magnetic write pole within the trench. The adhesion layer located outside of the trench prevents de-lamination during the chemical mechanical polishing. However, not having any adhesion layer in the trench prevent oxidation related waviness or other deformation of the sides of the write pole.

12 Claims, 14 Drawing Sheets

METHOD FOR MANUFACTURING A MAGNETIC WRITE POLE WITH A CONSISTENT BEVEL ANGLE

FIELD OF THE INVENTION

The present invention relates to magnetic data recording and more particularly to a damascene process for manufacturing a magnetic write pole having a well controlled, consistent bevel angle.

BACKGROUND

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

In order to maximize data density it is necessary to minimize the size of various components of the read and write elements. For example, in order to minimize the recorded track-width the width of the write pole must be reduced. This however presents manufacturing challenges. As the size of the write pole shrinks, it becomes ever more difficult to pattern and define a write pole with well controlled critical dimensions and smooth side walls. Therefore, there remains a need for a process for producing a well defined, accurately controlled write pole at very small cross sectional dimensions.

SUMMARY

The present invention provides a method for manufacturing a magnetic write head. The method includes depositing a RIEable fill layer, and then forming a mask structure over the fill layer. An adhesion layer is then deposited over the mask structure and the RIEable fill layer, the adhesion layer being a material that can function as both a reactive ion etching mask and an adhesion layer. The mask structure is then removed, thereby leaving an opening in the adhesion layer, and a reactive ion etching is performed to remove the RIEable fill layer that is not protected by the adhesion layer, thereby forming a trench in the RIEable fill layer. A seed layer is then deposited followed by a non-magnetic gap layer, and electroplating of a magnetic material. A chemical mechanical polishing process is then performed.

This process advantageously results in the adhesion layer only being present in areas outside of the trench. This prevents inconsistent oxidation of the adhesion layer by the reactive Ru CVD within the trench, which would otherwise result in roughness of the write head side gap of a finished write head. In this way, the adhesion layer is located outside of the trench where it is needed most to prevent de-lamination, but is not present within the trench where its oxidation would lead to topography and deformation of the side gap of the finished write pole.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

Figure 1:
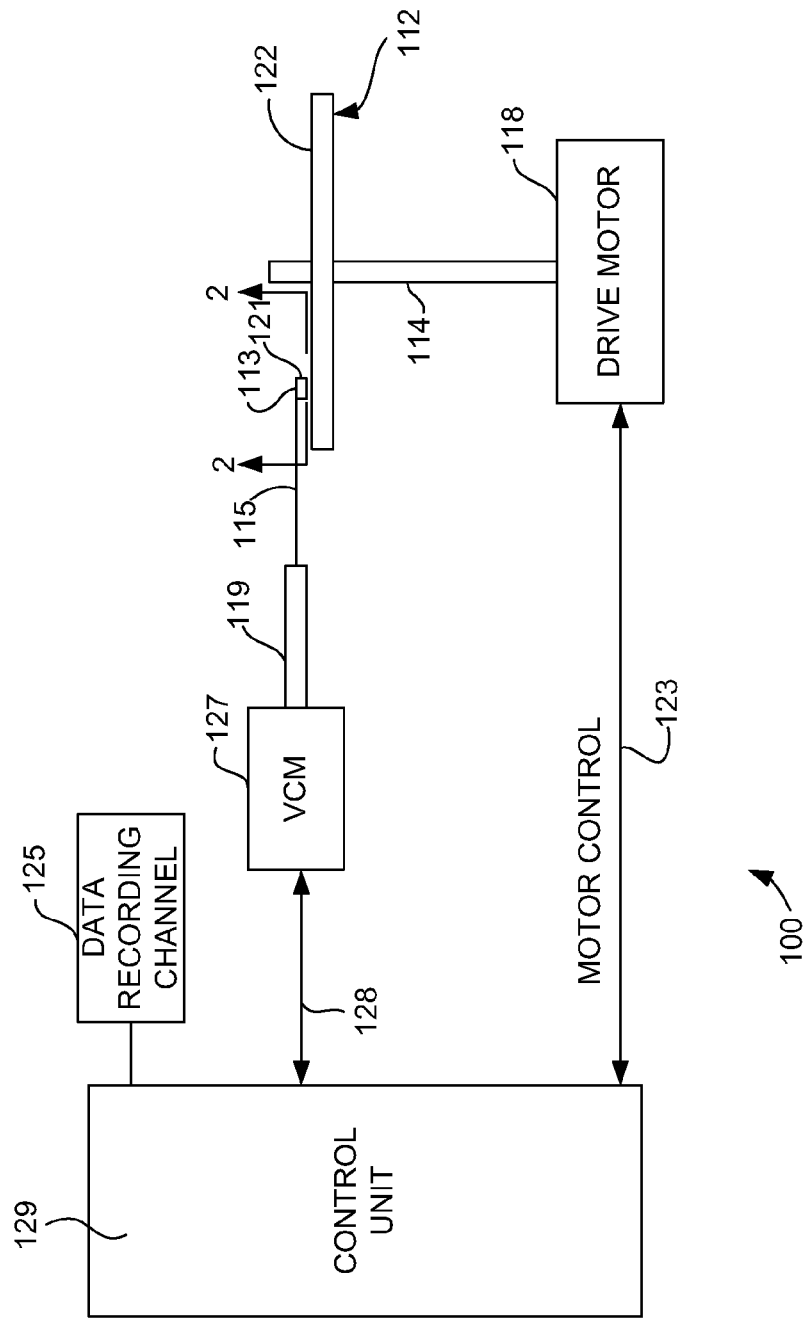
FIG. 1 is a schematic illustration of a disk drive system in which the invention might be embodied.

The following description is of the best embodiments presently contemplated for carrying out this invention. This description is made for the purpose of illustrating the general principles of this invention and is not meant to limit the inventive concepts claimed herein. Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
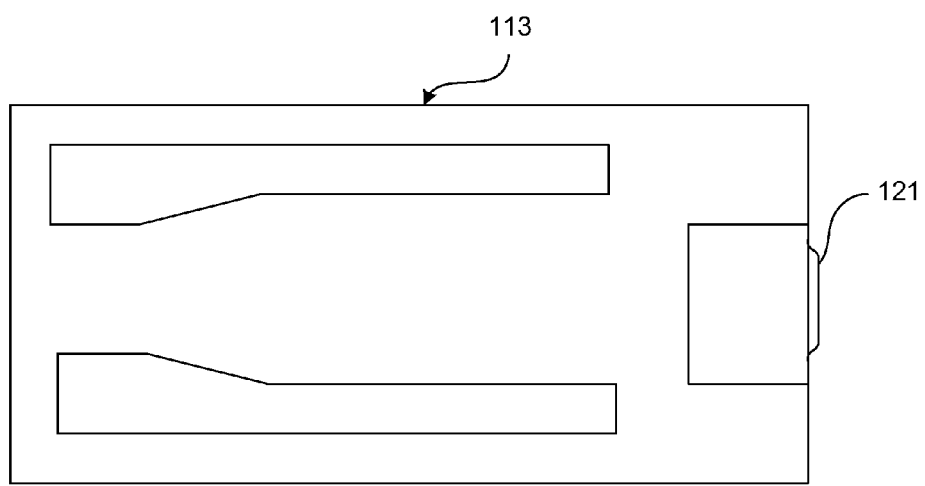
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive, perpendicular write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
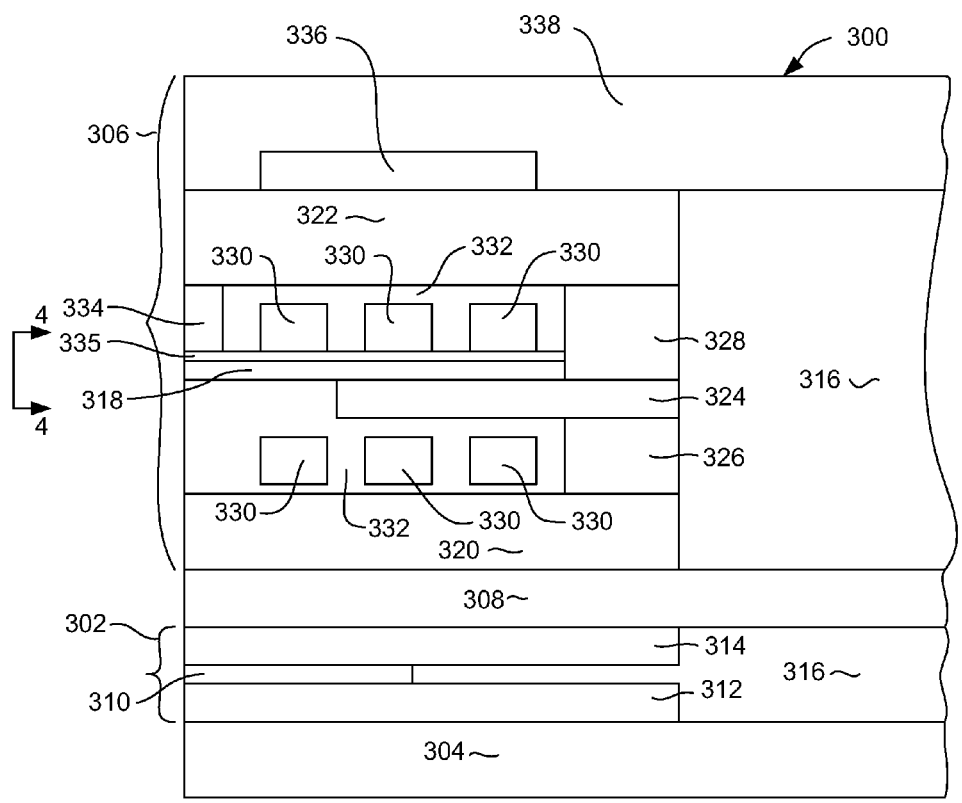
FIG. 3 is a side cross sectional view of a magnetic head according to an embodiment of the invention.

FIG. 3 shows a side, cross sectional view of magnetic head 300 according to a possible embodiment of the invention. The magnetic head 300 includes a read head 302 formed on a slider body substrate 304, and a write head 306 formed over the read head 302. The read head 302 and write head 306 may be separated by a non-magnetic spacer layer 308 such as alumina. The read head 302 can include a magnetoresistive sensor element 310 sandwiched between first and second magnetic shields 312, 314, all of which can be encased in a non-magnetic electrically insulating fill layer 316 such as alumina.

The write head 306 includes a magnetic write pole 318, a leading magnetic return pole 320, and may include a trailing return pole 322. The write pole 318 can be magnetically connected with a magnetic shaping layer 324 that helps to conduct magnetic flux to the write pole. The write pole 318 and shaping layer 324 can be magnetically connected with the return poles 320, 322 by magnetic back gap structures 326, 328. The write head 306 also includes a non-magnetic, electrically conductive write coil 330, which can be constructed of a material such as Cu and which is shown in cross section in FIG. 3. The write coil 330 can be embedded in one or more non-magnetic insulation layers 332 which can be a material such as alumina and/or hard baked photoresist or other suitable insulating materials.

When an electrical current flows through the write coil 330, a resulting magnetic field causes a magnetic flux to flow through the magnetic layers 320, 326, 324, 328, 318, 322. This causes a write field to be emitted from the tip of the write pole 318 at the air bearing surface (ABS), which can write a bit of data to an adjacent magnetic medium (not shown in FIG. 3). A magnetic trailing shield 334 can be provided adjacent to the trailing edge of the write pole 318 and can be connected with the trailing return pole 322 as shown in FIG. 3. The magnetic shield 334 is separated from the trailing edge of the write pole 318 by a non-magnetic trailing gap layer 335. This trailing magnetic shield 334 increases the field gradient of the write field being emitted from the write pole 318. This results in improved magnetic switching during writing of data. FIG. 3 and subsequent Figures are only schematics for illustration purposes, other fine features such as leading shield and other detailed geometric features of the write pole assembly are intentionally omitted for clear and simpler illustrations.

Figure 4:
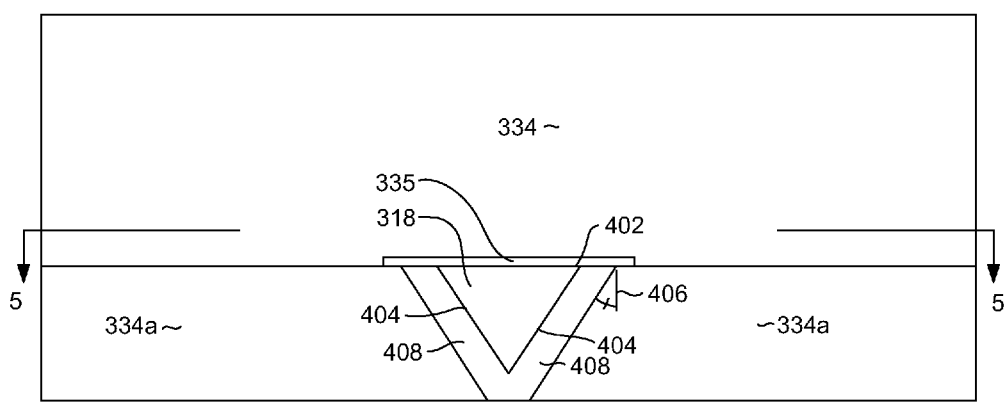
FIG. 4 is an ABS view of the magnetic recording head as seen from line 4-4 of FIG. 3.

FIG. 4 is an enlarged view of a portion of the write head 300 as viewed from the ABS from line 4-4 of FIG. 3. As seen in FIG. 4, the write pole 318 has a trailing edge 402 and has sides 404 that are beveled to define an angle 406 relative to a plane that is parallel with the data track direction and perpendicular to the trailing edge 402 of the write pole 318. This bevel angle 406 is well controlled and uniform, as a result of a manufacturing process that will be described herein below. It can also be seen that the trailing shield 334 can wrap around the write pole to provide side shield portions 334a. Each of the side shield portions 334a are separated from the sides 404 of the write pole 318 by a non-magnetic side gap layer 408. It can also be seen in FIG. 4 that the side gap material 408 (e.g. Ru) is directly in contact with the side shields 334a. There is no adhesion layer (e.g. Ta) at the interface between the side gap 408 and side shield 334a. This is a result of a manufacturing process that allows the side gap layer 408 to be grown directly from Ru seed, rather than on top of an adhesion layer. This process will be described in greater detail herein below. The resulting gap material 408 has a more ordered, columnar granular growth structure than would be the case if it were grown on an oxide adhesion layer such as Ta, which would inevitably oxidize to form TaO. Growth of a Ru side gap material on an oxide would result in a more random structure and also in undesirable distortions and waviness, as will be described fuller herein below.

Figure 5:
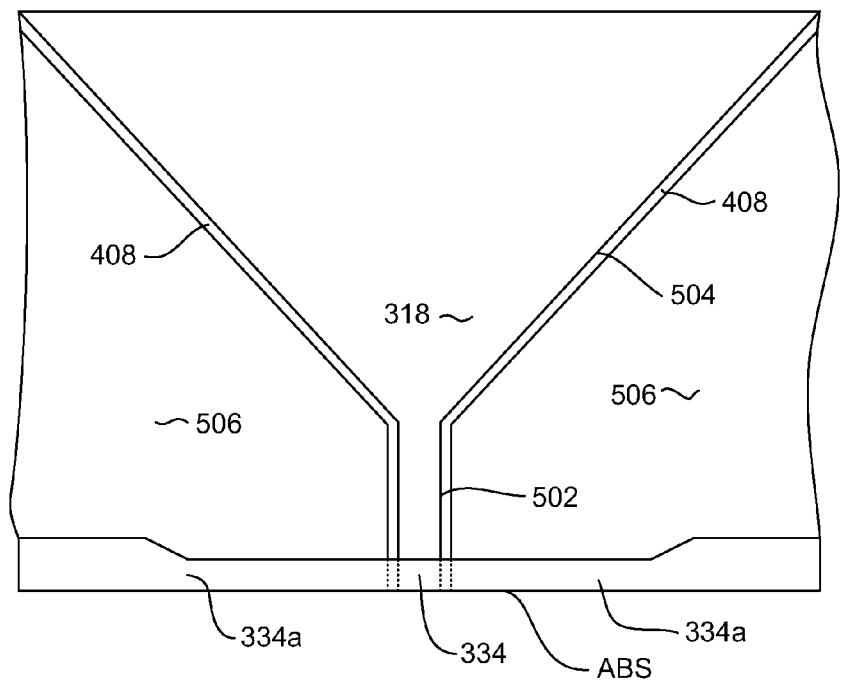
FIG. 5 is a top down view of a portion of the magnetic write head as seen from line 5-5 of FIG. 4.

FIG. 5 shows a top down view as taken from line 5-5 of FIG. 4. FIG. 5 shows how the write pole 318 has a pole tip portion 502 and a flared portion 504. The portion of the write pole 318 at the ABS is shown in dotted line to indicate that it passes beneath the trailing shield 334. The space behind the shield 334 and surrounding the write pole 318, side gap 408 and side shield 334a can be filled with a non-magnetic, electrically insulating material 506 such as alumina or other insulating materials.

When the bevel angle of a write pole 318 (FIG. 4) is not well controlled, the write-track boundary 404 might not be as sharp as designed, resulting in cross track interference. For this reason, a tight distribution of bevel angle is highly desirable during wafer manufacturing. Control of the bevel angle becomes a yield improvement issue. Proper screening of heads with inconsistent bevel angles is a significant factor for quality control.

If the interface 404 of the Ru side gap 408 (FIG. 4) with the main pole 318 is wavy or rough, the resulting bevel angle measurement will not be representative of the true geometry, because it deviates from linear interface assumption in the measurement algorithm. Irrespective of the head performance, a head having such an abnormality will either be screened out as yield loss or escape un-noticed and become a quality concern. It is, therefore, of interest to eliminate the root cause of a wavy or rough Ru side gap 408. Relying on measurement screening is costly and may not be ineffective.

An adhesion layer is needed before deposition of a Ru gap layer, because Ru, as with other platinum metals, is a noble metal with poor adhesion to other types of materials. Material candidates that provide good properties for use as an adhesion layer are usually reactive and prone to oxidation. The inventors have found that waviness or roughness in the non-magnetic gap layer 408 can stem from the use of an adhesion layer in the trench followed by a Ru pre-seed for proper growth of psudo Atomic Layer Chemical Vapor Deposition of Ru. Such seed layer stacks have in the past been deposited after the formation of the trench in order to ensure good adhesion of the Ru gap 408 during fabrication. Using such a method, the adhesion layer would be deposited within the trench as well as outside of the trench over the hard mask layer. Common adhesion materials may be materials such as Cr, Ta, and/or other reactive metals. One commonly used prior art adhesion is Ta. Due to poor coverage of Ta/Ru pre-seed inside of the trench, Ta may be partially exposed to oxygen environment inherently existing due to $RuO_4$ reduction reaction used for Ru Atomic Layer Chemical Vapor Deposition. An incomplete Ru pre-seed coverage leads to localized oxidation of Ta. The inventors have discovered that observed waviness or bumps inside of the trench are a result of volume expansion from such oxidation and subsequent growth of Ru metal from TaOx rather than from Ru. Outside of the trench where coverage is reasonable, the presence of Ta adhesion is needed where: (1) it needs to withstand CMP abrasion; (2) Ru coverage is thicker and more uniform and, therefore, better insulates the Ta adhesion from oxidation; and (3) Ru that forms the gap stack is sacrificial out side of the trench for the finished product.

The present invention provides a method for forming a main pole side gap without any Ta or adhesion layer in the trench. The monolithic Ru side gap eliminates roughness induced by localized Ta oxidation in the trench and reduces bevel angle variation that would otherwise result from a wavy main pole interface with Ru side gap. By fundamentally reducing the bevel angle variation, the quality of the write head is improved with increasing wafer yield.

Figure 6:
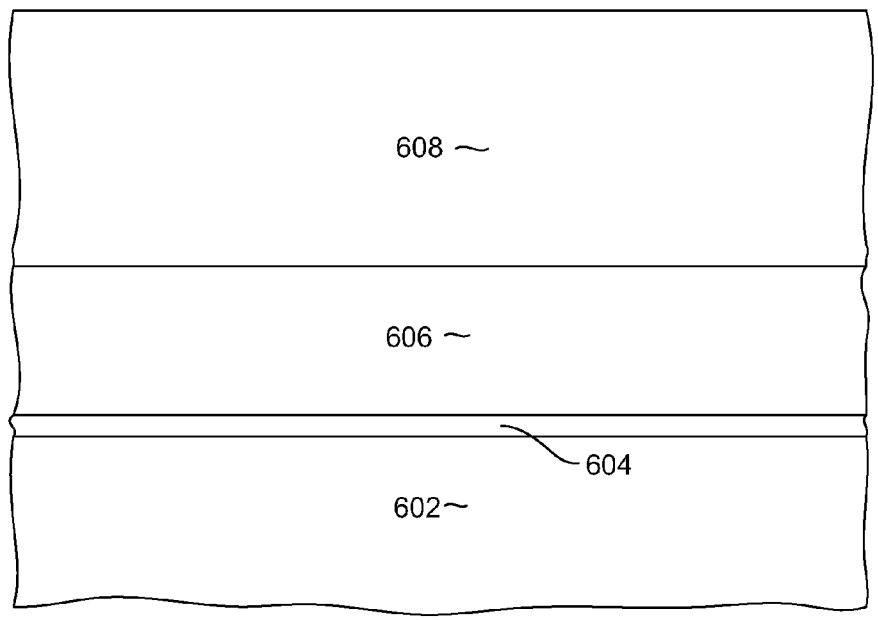
FIGS. 6-12 are views of a portion of a magnetic write head in various intermediate stages of manufacture, illustrating a method of manufacturing a magnetic write head according to an embodiment of the invention.

FIGS. 6-12 show a portion of a magnetic write head in various intermediate stages of manufacture in order to illustrate a method of manufacturing a magnetic write head according to an embodiment of the invention. With particular reference to FIG. 6, a substrate 602 is formed, which may include the shaping layer 324 and non-magnetic layer 332 of FIG. 3. An etch stop layer 604 is deposited over the substrate 602. The etch stop layer 604 is a material that is resistant to removal by reactive ion etching (RIE). Suitable materials for the etch stop layer 604 include Cr, NiCr or NiFe which can be deposited to a thickness of 20-50 nm. A fill layer 606 can be deposited over the etch stop layer 604. The fill layer 606 can be constructed of a material that can be removed by reactive ion etching (RIE) such as alumina ($Al_2O_3$) and is deposited at least to the height of a write pole to be formed, for reasons that will become clear below. Then, a mask layer 608 is formed over the fill layer 606. The mask includes a photoresist material, but could include other materials layers as well.

Figure 7:
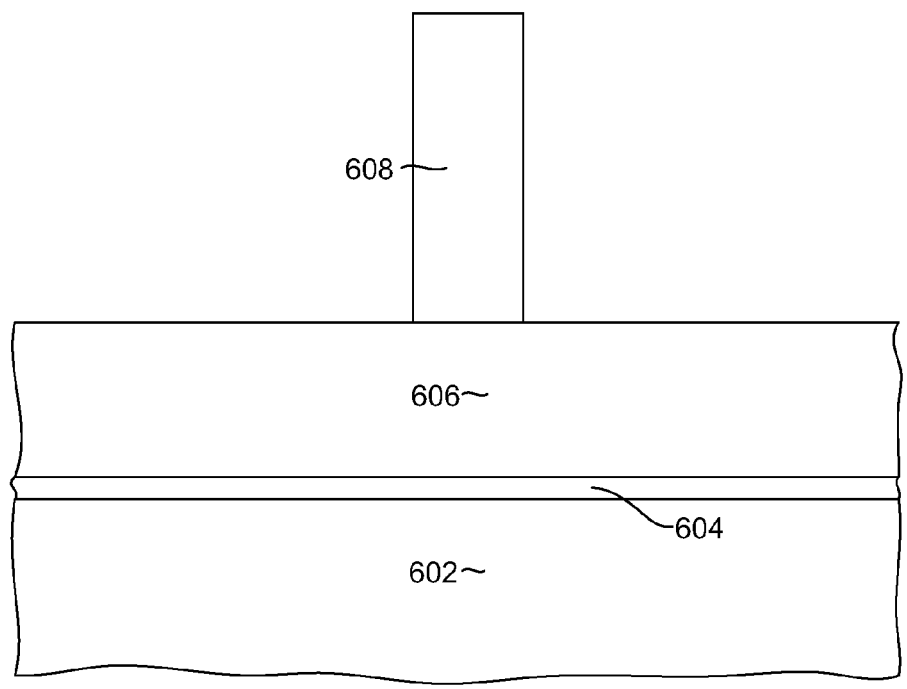
Figure 8:
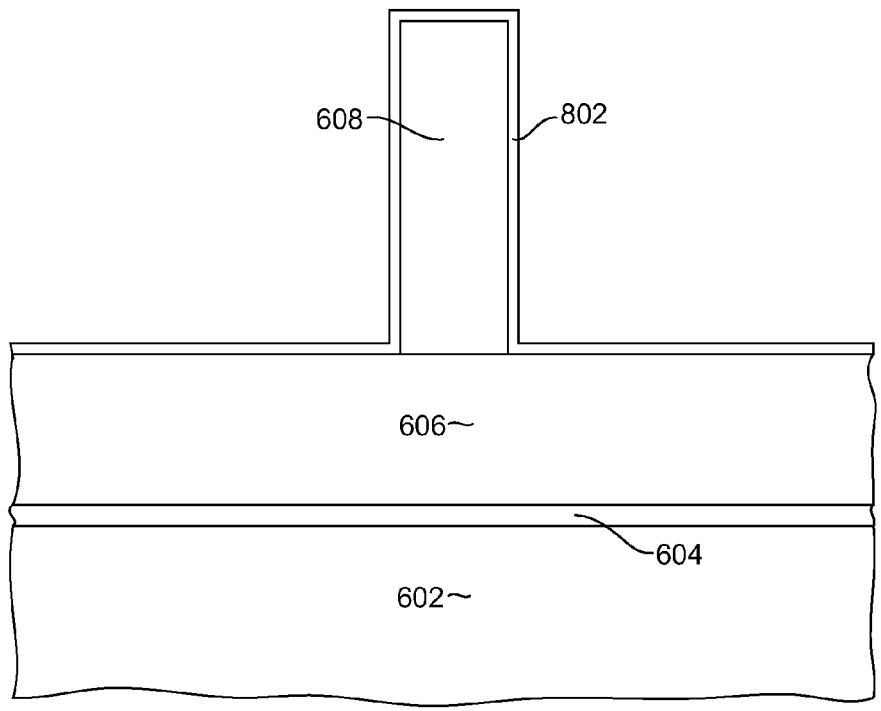
Figure 9:
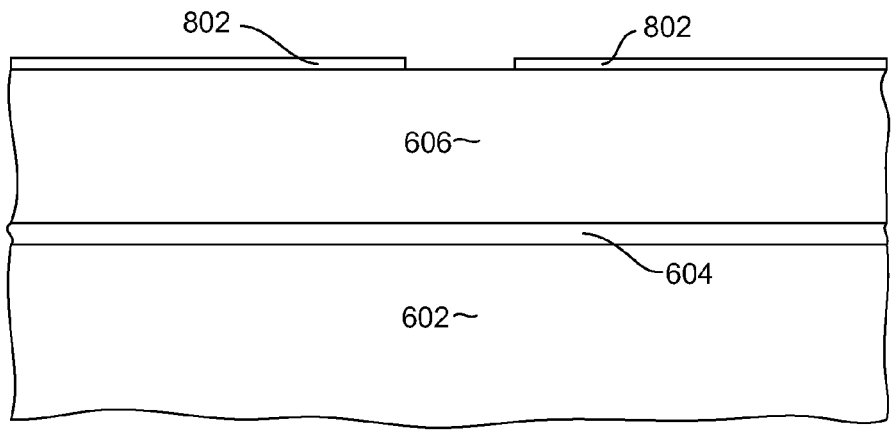

With reference now to FIG. 7, the mask 608 is photolithographically patterned so as to have a width that will define a write pole width. Then, with reference to FIG. 8 a layer of material 802 is deposited over the mask 608 and fill layer 606. The layer 802 is a material that can function both as a reactive ion etching mask (RIE mask) as well as serving as an adhesion layer for the later deposition of Ru (as will be seen below). To this end, the adhesion/RIE mask layer 802 can be constructed of Ta, Cr, NiCr or similar materials. After the adhesion/RIE mask layer 802 has been deposited, the mask 608 can be lifted off. This can be accomplished by a process such as wrinkle bake, chemical liftoff, chemical mechanical polishing or a combination of one or more of these. Removing the mask 608 results in a structure as shown in FIG. 9 with an opening in the adhesion/RIE mask layer 802. The side wall coverage is preferably formed such that mask liftoff can be performed.

Figure 10:
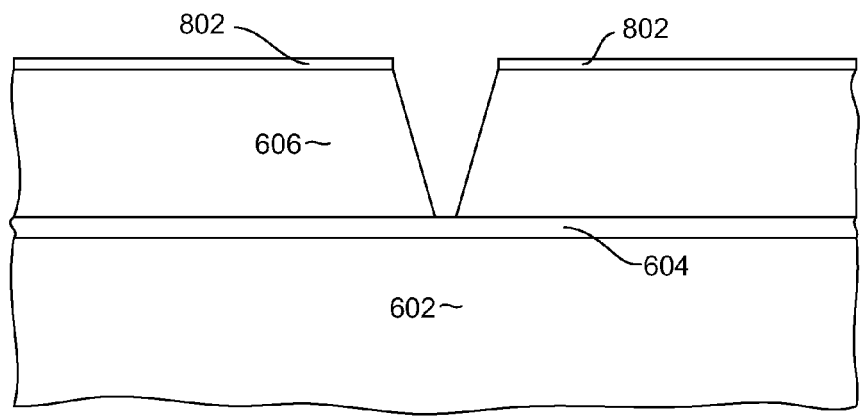

With the opening thus formed in the adhesion/RIE mask layer 802 a reactive ion etching is performed to remove portions of the RIEable fill layer 606 that are not protected by the adhesion/RIE mask 802. The reactive ion etching is performed in such a manner as to form a trench with sloping side walls as shown in FIG. 10. After the RIE process has been performed, a quick reactive ion etching can be performed to clean the Ta adhesion layer 608 by removing oxide ($TaO_4$) from the surface of the adhesion layer. This reactive ion etching can be performed in a chemistry that includes oxygen. Then, further processing steps can be performed in-situ as described below.

Figure 11:
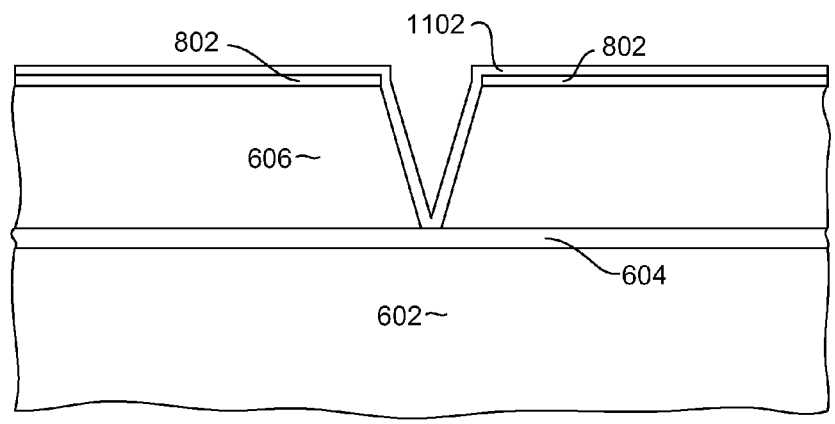

After the trench has been formed in the fill layer 606, a Ru pre-seed layer 1102 is deposited by a method such as sputter deposition. As can be seen in FIG. 11, in the trench the pre-seed 1102 is deposited directly onto the fill layer 606, whereas the adhesion/RIE mask 802 is only located in areas outside of the trench. This is advantageous for reasons that will be described in greater detail herein below.

Figure 12:
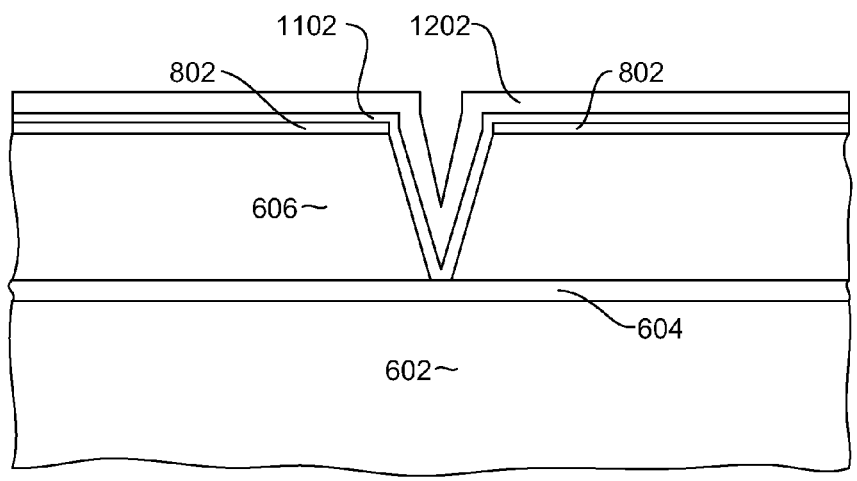
Figure 13:
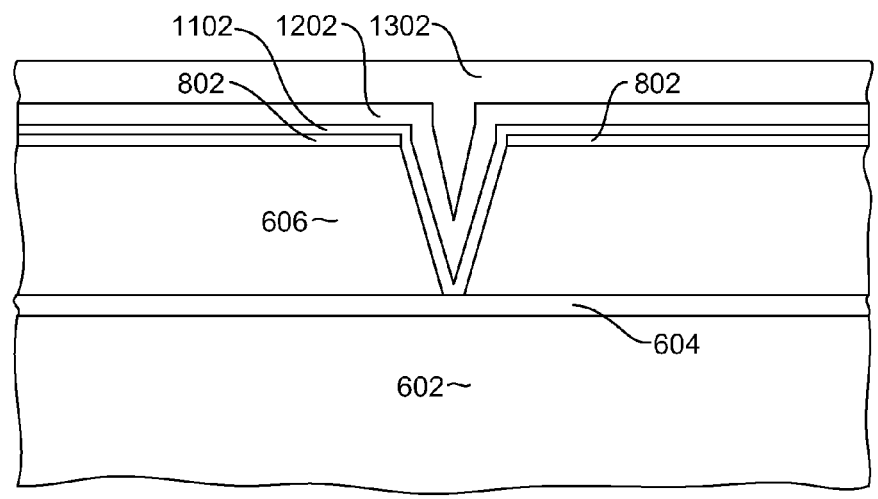
FIGS. 13-14 are views of a portion of a magnetic write head in intermediate stages of manufacture, illustrating a method for manufacturing a magnetic write head according to an alternate embodiment of the invention.

With reference now to FIG. 12 a Ru side gap layer 1202 is deposited onto the Ru pre-seed layer 1102. The Ru side gap layer 1202 is preferably deposited by a process such as atomic layer chemical vapor deposition which deposits the material 1202 in a conformal manner so as to deposit well into the trench formed in the fill layer 606. Then, with reference to FIG. 13 a magnetic material 1302 is deposited over the side wall layer 1202 and into the trench. The magnetic material 1302 is preferably deposited by electroplating and can be constructed of a high magnetic saturation material such as CoFe. Then, after the magnetic material 1302 has been electroplated, a chemical mechanical polishing CMP can be performed to remove portions of the magnetic material 1302 that extend out of the trench, leaving a structure as shown in FIG. 14, with a magnetic write pole 1302 formed in the trench.

Figure 14:
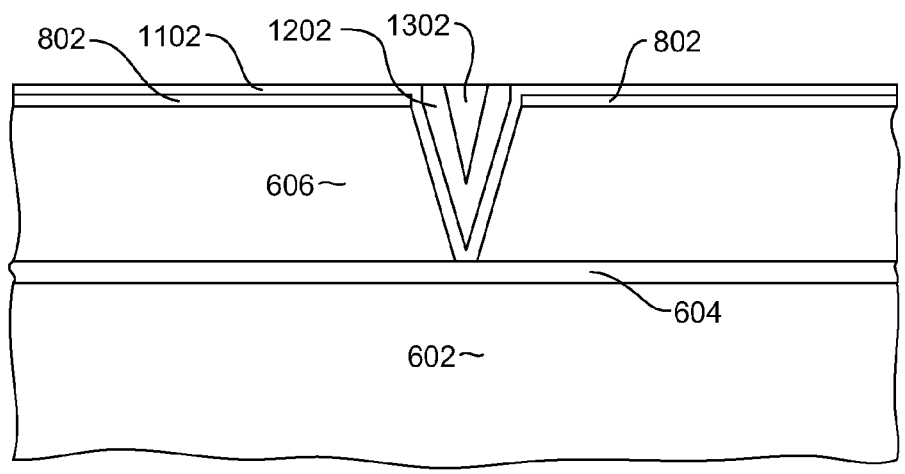

After the structure has been formed as shown in FIG. 14, other processes can be performed to remove the remaining fill layer 606 and to form a trailing-wrap around shield. Alternatively, the layers 606, 802, and portions of layers 1202 that are outside of the trench can left intact and a trailing magnetic shield can be formed there-over.

Ru, as with any other noble metal, is prone to de-lamination without proper adhesion. However, de-lamination is also proportional to the area of exposure to mechanical erosion (such as chemical mechanical polishing and processes with stress cycling). One way to minimize the risk of de-lamination and to practically prevent it from happening is to deposit an adhesion layer prior to deposition of the Ru. To achieve this, the most intuitive method is to have Ta (or other reactive metals) adhesion laid in-situ prior to the Ru sub-seed, as is known to the prior art. However, the inventors have discovered that prior art method of producing a Ru gap induces waviness and surface bumps to the gap-pole interface. It has been found that when pseudo-atomic layer Ru deposition is deposited over Ta/Ru sub-seed, the Ta oxidizes. A non-uniform oxidation in the trench induces roughness in the gap surface. This problem is expected to be universal to any metallic adhesion layer since a good adhesion layer will also be easy to oxidize. Therefore, a process without Ta nor any adhesion is needed. A solution to avoid a compromise between proper adhesion and smooth Ru surface is to engineer an ex-situ adhesion layer process where an adhesion layer is present outside of the trench in the peripheries while inside the trench the adhesion layer is absent. Such an arrangement provides adhesion to Ru where it needed the most, i.e., surfaces subject to CMP mechanical abrasion, and leaving no adhesion layer (e.g. no Ta) inside the trench where it would induce roughness. The above disclosed process addresses this problem by providing a method for applying an adhesion layer only in areas outside of the trench. This proper "ex-situ" and "discontinuous" adhesion layer can be deposited after the trench lithography mask 608 (FIG. 7) has been patterned and before Ru seed is to be deposited, as opposed to depositing it in-situ as a Ta/Ru stack.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
    depositing a RIEable fill layer;
    forming a mask structure over the fill layer;
    depositing an adhesion layer over the mask structure and the RIEable fill layer, the adhesion layer being a material that can function as both a reactive ion etching mask and an adhesion layer;
    removing the mask structure, thereby leaving an opening in the adhesion layer;
    performing a reactive ion etching to remove the RIEable fill layer that is not protected by the adhesion layer, thereby forming a trench in the RIEable fill layer;
    depositing a seed layer;
    depositing a non-magnetic gap layer over the seed;
    electroplating a magnetic material; and
    performing a chemical mechanical polishing.

2. The method as in claim 1, wherein the seed layer comprises Ru and wherein the non-magnetic gap layer comprises Ru.

3. The method as in claim 1 wherein the adhesion layer comprises Ta.

4. The method as in claim 1 wherein the adhesion layer comprises Ta, Cr or NiCr.

5. The method as in claim 1 further comprising, after removing the mask structure and before performing the reactive ion etching to form the trench in the RIEable fill layer, performing a quick reactive ion etching to remove oxidation from the adhesion layer.

6. The method as in claim 5 wherein the reactive ion etching used to remove any oxidation from the adhesion layer is a pre-sputter etch performed using an Ar chemistry.

7. The method as in claim 5 wherein the gap layer is deposited by atomic layer chemical vapor deposition.

8. The method as in claim 5 wherein the when reactive ion etching used to remove oxidation from the adhesion layer is a pre-sputter etch performed in a chemistry that includes Ar and the reactive ion etching used to form the trench in the RIEable fill layer is performed in such a manner as to form tapered side walls on the RIEable fill layer.

9. The method as in claim 1 wherein the seed layer is deposited both inside the trench and outside the trench.

10. The method as in claim 1 wherein the seed layer is deposited both inside the trench and outside the trench, but the adhesion layer is only located outside the trench.

11. The method as in claim 1 further comprising, after performing the chemical mechanical polishing, removing the RIEable fill layer and forming a magnetic, wrap-around trailing shield.

12. The method as in claim 1 further comprising, after performing the chemical mechanical polishing, forming a trailing magnetic shield.

* * * * *